No. 782,851. Patented February 21, 1905.

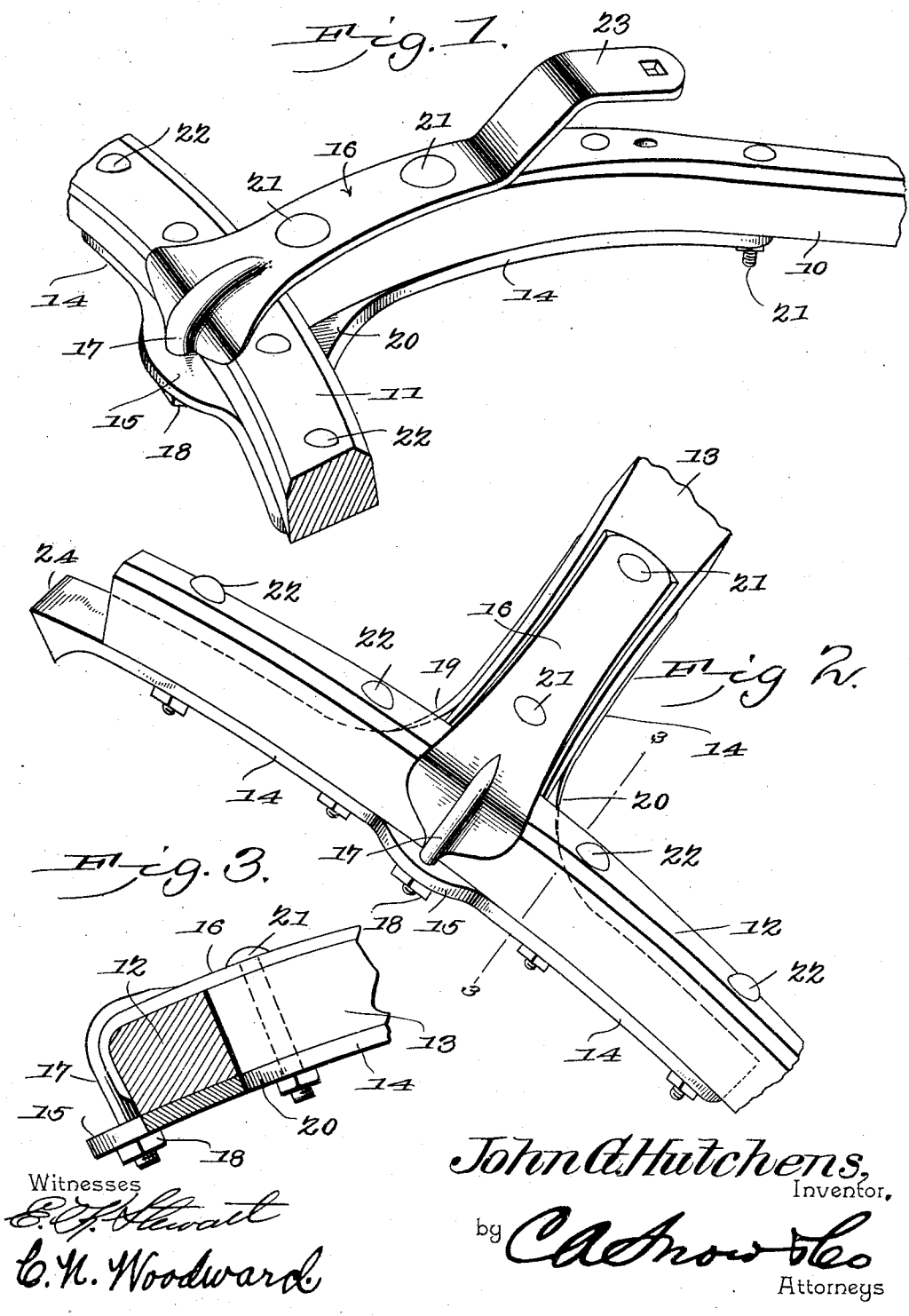

UNITED STATES PATENT OFFICE.

JOHN G. HUTCHENS, OF BEAGLE, KANSAS.

SHAFT-IRON.

SPECIFICATION forming part of Letters Patent No. 782,851, dated February 21, 1905.

Application filed October 12, 1904. Serial No. 228,192.

*To all whom it may concern:*

Be it known that I, JOHN G. HUTCHENS, a citizen of the United States, residing at Beagle, in the county of Miami and State of Kansas, have invented a new and useful Shaft-Iron, of which the following is a specification.

This invention relates to clamping devices for firmly uniting two bodies, and more particularly two bodies disposed at angles to each other, such as thills and draft-tongues and their cross-bars and other portions of vehicle running-gears, and has for its object to strengthen the clamping means which unite members of this character and to form a joint which will be fully as strong as any other portion of the body or structure.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of portions of a draft-tongue and its cross-bar with the improved clamping device applied. Fig. 2 is a similar view of portions of a thill and its cross-bar with the improved clamping device applied. Fig. 3 is a transverse section on the line 3 3 of Fig. 2.

The improved device may be employed for uniting two bodies of various shapes and forming portions of various structures, but for purpose of illustration is shown securing a draft-tongue 10 to its cross-bar 11 or a thill member 12 to its cross-bar 13, to which purpose the improved device is more particularly adapted.

The improved device comprises a brace-plate 14, of approximately T shape, as shown, and conforming substantially to the adjacent portions of the thills or draft-tongues and the cross-bars of the same, said plate being provided with a perforated projection 15 opposite the abutting points of the two bodies and a clamping-plate 16, extending along the tongue 10 and over the abutting portion of the cross-bar 13 or along the cross-bar 11 and over the abutting portion of the thill 12, as the case may be, and terminating in a threaded stud 17 for engagement with the aperture in the projection 15, said stud being secured in place by a nut 18, bearing against the outer surface of the projection. The juncture of the two parts of the T-shaped brace-plate is reinforced by curved integral webs 19 20, which greatly stiffen and strengthen the device without materially increasing the weight or adding to the expense thereof. The head portion of the brace-plate is secured as by clamp-bolts 22, and the clamp-plate is likewise secured by bolts 21 passing through the "leg" portion of the brace, thus utilizing the same bolts to connect the clamp-plate and brace-plate in position. The clamp-plate 16 when employed upon a draft-tongue, as in Fig. 1, is extended into the keeper 23 of the doubletree-pivot or coupling-pin, and when the device is employed upon the thills one of the ends of the brace-plate will be extended, as at 24, for welding to the axle coupling member. It will thus be obvious that a very strong and durable clamping means between two bodies is provided, which may be inexpensively manufactured, readily applied, and will render a joint thus united fully as strong, if not stronger, than other portions of the structure.

With this simple device the heretofore relatively weak joints between the thill or tongue and the cross-bars are rendered very strong and durable and as able to stand severe strains as other portions of the vehicle.

Having thus described the invention, what is claimed is—

1. A clamping device for uniting two members comprising a brace-plate for attachment to one side of said members, and provided with laterally-extending arms, and an intermediate perforated projection, a clamping-plate for attachment to the opposite side of said members and provided with a terminal threaded stud for engagement with said perforation, and a nut engaging the threaded stud and bearing against the outer face of said brace-plate.

2. A clamping device for uniting two members disposed at an angle to each other consisting of an approximately T-shaped brace-plate for attachment to one side of said members and conforming substantially thereto, said plate being provided with a perforated projection, a clamping-plate for attachment to the opposite side of said members and provided with an extension terminating in a threaded stud for engagement with said perforation, and a nut engaging the threaded stud and bearing against said projection.

3. A clamping device for uniting a draft-tongue to its cross-bar consisting of a substantially T-shaped brace-plate for attachment to the adjacent portions of said tongue and cross-bar and provided with a perforated projection, a clamping-plate for attachment to said tongue and extending over the cross-bar, said clamping-plate being extended at one end to form a doubletree-keeper and having its opposite end provided with a threaded stud for engagement with said perforation, and a nut engaging the threaded stud and bearing against said projection.

4. A clamping device for uniting two members comprising a brace-plate for attachment to one side of said members and provided with a perforated projection, a clamping-plate for bearing upon the opposite side of said members and provided with an extension terminating in a threaded stud for engagement with said perforation, a nut engaging the threaded stud and bearing upon said projection, and binding-bolts passing through said plates and members.

In testimony that I claim the foregoing as my own I have hereto affixed my signature in the presence of two witnesses.

JOHN G. HUTCHENS.

Witnesses:
   EDMUND SMITH,
   WALLACE MORSE.